United States Patent
Ozturk et al.

(10) Patent No.: US 12,301,362 B2
(45) Date of Patent: May 13, 2025

(54) HYBRID AUTOMATIC REPEAT REQUEST (HARQ) TIMERS WITH ONE SHOT HARQ FEEDBACK

(71) Applicant: QUALCOMM Incorporated, San Diego, CA (US)

(72) Inventors: Ozcan Ozturk, San Diego, CA (US); Xiaoxia Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/841,548

(22) Filed: Jun. 15, 2022

(65) Prior Publication Data
US 2023/0084318 A1  Mar. 16, 2023

Related U.S. Application Data

(60) Provisional application No. 63/245,085, filed on Sep. 16, 2021.

(51) Int. Cl.
*H04L 1/18* (2023.01)
*H04L 1/1812* (2023.01)
*H04W 76/28* (2018.01)

(52) U.S. Cl.
CPC ........... *H04L 1/1812* (2013.01); *H04W 76/28* (2018.02)

(58) Field of Classification Search
CPC ..... H04W 80/04; H04W 88/06; H04W 88/08; H04W 84/18; H04W 76/28; H04L 29/06; H04L 1/1812

USPC .......................................... 370/328
See application file for complete search history.

(56) References Cited

U.S. PATENT DOCUMENTS

| | | | | |
|---|---|---|---|---|
| 8,340,052 B2 * | 12/2012 | Tseng | ...................... | H04L 1/1822 370/335 |
| 11,791,944 B2 * | 10/2023 | Yang | ...................... | H04L 1/1861 370/328 |
| 2009/0046627 A1 * | 2/2009 | Xu | ......................... | H04W 76/28 370/328 |

(Continued)

FOREIGN PATENT DOCUMENTS

| EP | 2 079 181 A1 * | 7/2009 | ................ H04L 1/18 |
|---|---|---|---|
| EP | 2 782 409 A1 * | 9/2014 | ............ H04W 72/04 |

(Continued)

OTHER PUBLICATIONS

International Search Report and Written Opinion—PCT/US2022/040811—ISA/EPO—Dec. 19, 2022.

*Primary Examiner* — Peter G Solinsky
*Assistant Examiner* — Sanjay K Dewan
(74) *Attorney, Agent, or Firm* — Seyfarth Shaw LLP

(57) ABSTRACT

A method of wireless communication by a user equipment (UE) includes receiving, from a network entity, a request for one shot hybrid automatic repeat request (HARQ) feedback for multiple HARQ processes. The method also includes transmitting, to the network entity, the one shot HARQ feedback in response to receiving the request. The method further includes starting or restarting a discontinuous reception (DRX) HARQ round trip time (RTT) timer for one of the multiple HARQ processes based at least on satisfying a condition, after transmitting the one shot HARQ feedback.

27 Claims, 8 Drawing Sheets

(56) References Cited

U.S. PATENT DOCUMENTS

| | | | | |
|---|---|---|---|---|
| 2010/0035624 | A1* | 2/2010 | Tseng | H04W 76/28 370/328 |
| 2011/0170420 | A1* | 7/2011 | Xi | H04L 5/001 370/328 |
| 2012/0275397 | A1* | 11/2012 | Hsieh | H04L 5/0044 370/328 |
| 2013/0064180 | A1* | 3/2013 | Bergman | H04L 1/1825 370/328 |
| 2021/0058945 | A1* | 2/2021 | Zhang | H04W 52/0225 |
| 2022/0015187 | A1* | 1/2022 | Huang | H04W 72/1268 |
| 2022/0094484 | A1* | 3/2022 | Babaei | H04W 72/1263 |
| 2022/0394734 | A1* | 12/2022 | MolavianJazi | H04W 72/0453 |
| 2023/0097118 | A1* | 3/2023 | Tseng | H04W 24/08 370/329 |
| 2023/0139122 | A1* | 5/2023 | Park | H04W 28/0268 370/328 |
| 2023/0156859 | A1* | 5/2023 | Park | H04W 76/28 370/329 |
| 2023/0163889 | A1* | 5/2023 | Dimou | H04L 1/1614 370/328 |
| 2023/0208570 | A1* | 6/2023 | Hu | H04L 1/1887 370/328 |
| 2023/0209535 | A1* | 6/2023 | Park | H04W 72/23 370/329 |
| 2023/0209648 | A1* | 6/2023 | Park | H04W 4/40 370/329 |
| 2023/0269822 | A1* | 8/2023 | Back | H04W 76/19 370/328 |

FOREIGN PATENT DOCUMENTS

| | | | | |
|---|---|---|---|---|
| EP | 3 716 520 A1 * | 9/2020 | | H04L 5/00 |
| WO | WO 2020/101558 A1 * | 5/2020 | | H04W 52/02 |

* cited by examiner

HYBRID AUTOMATIC REPEAT REQUEST (HARQ) TIMERS WITH ONE SHOT HARQ FEEDBACK

CROSS-REFERENCE TO RELATED APPLICATION

The present application claims the benefit of U.S. Provisional Patent Application No. 63/245,085, filed on Sep. 16, 2021, and titled "HYBRID AUTOMATIC REPEAT REQUEST (HARQ) TIMERS WITH ONE SHOT HARQ FEEDBACK," the disclosure of which is expressly incorporated by reference in its entirety.

FIELD OF THE DISCLOSURE

The present disclosure relates generally to wireless communications, and more specifically to hybrid automatic repeat request (HARQ) timers with one shot HARQ feedback.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects of the present disclosure, a method of wireless communication by a user equipment (UE) includes receiving, from a network entity, a request for one shot hybrid automatic repeat request (HARQ) feedback for multiple HARQ processes. The method also includes transmitting, to the network entity, the one shot HARQ feedback in response to receiving the request. The method further includes starting or restarting a discontinuous reception (DRX) HARQ round trip time (RTT) timer for one of the HARQ processes based at least on satisfying a condition, after transmitting the one shot HARQ feedback.

In other aspects of the present disclosure, a method of wireless communication by a network entity station includes transmitting a request for one shot hybrid automatic repeat request (HARQ) feedback for multiple HARQ processes. The method also includes receiving the one shot HARQ feedback in response to receiving the request. The method further includes refraining from scheduling data for a period of time for one of the plurality of HARQ processes based at least on satisfying a condition, after receiving the one shot HARQ feedback.

Other aspects of the present disclosure are directed to an apparatus for wireless communication by a user equipment (UE) having a memory and one or more processors coupled to the memory. The processor(s) is configured to receive, from a network entity, a request for one shot hybrid automatic repeat request (HARQ) feedback for multiple HARQ processes. The processor(s) is also configured to transmit, to the network entity, the one shot HARQ feedback in response to receiving the request. The processor(s) is further configured to start or restart a discontinuous reception (DRX) HARQ round trip time (RTT) timer for one of the HARQ processes based at least on satisfying a condition, after transmitting the one shot HARQ feedback.

Other aspects are directed to an apparatus for wireless communication by a network entity station having a memory and one or more processors coupled to the memory. The processor(s) is configured to transmit a request for one shot hybrid automatic repeat request (HARQ) feedback for multiple HARQ processes. The processor(s) is also configured to receive the one shot HARQ feedback in response to receiving the request. The processor(s) is further configured to refrain from scheduling data for a period of time for one of the HARQ processes based at least on satisfying a condition, after receiving the one shot HARQ feedback.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
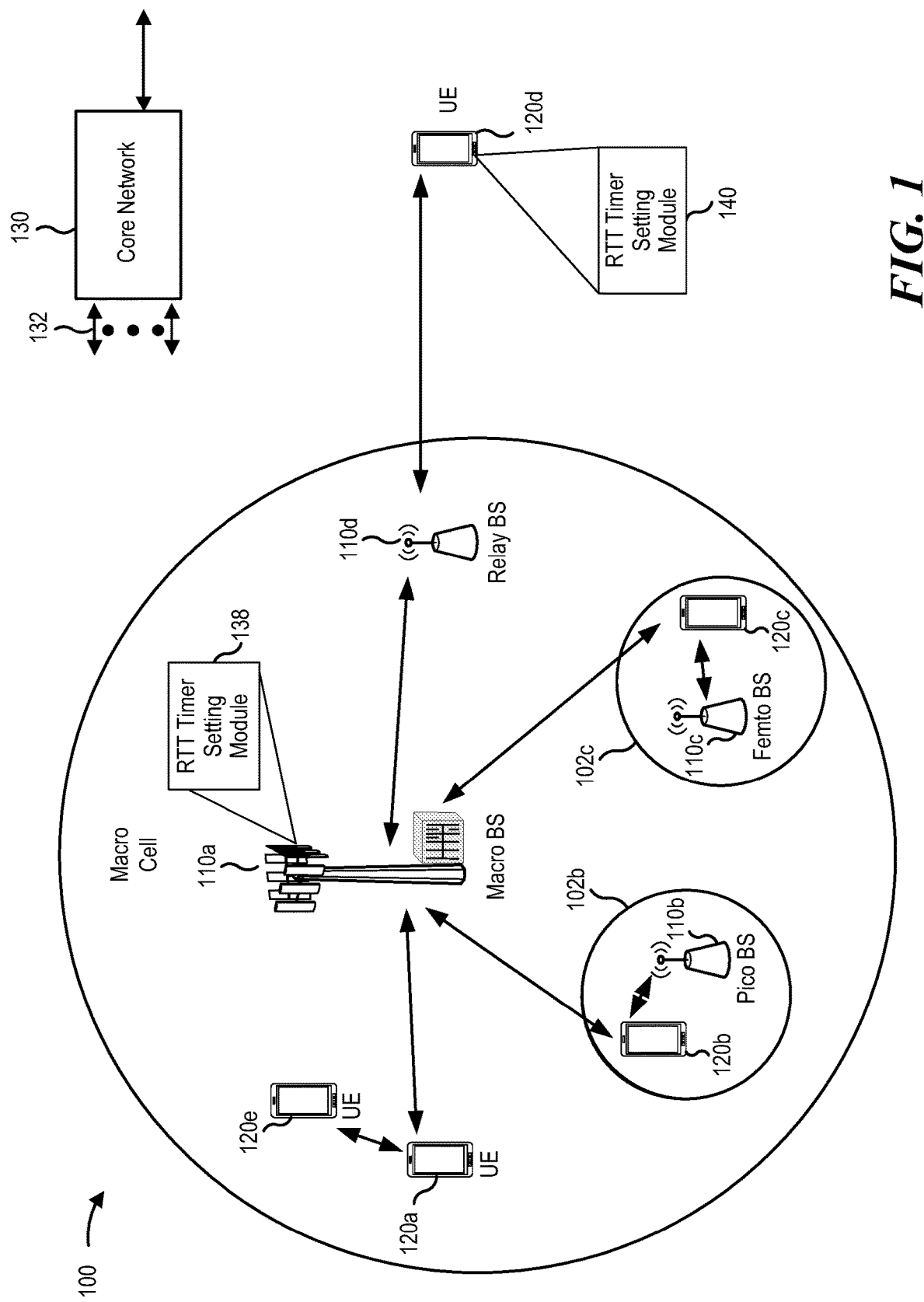
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Hybrid automatic repeat request (HARQ) processing improves communications reliability by acknowledging and negatively acknowledging packets transmitted across a wireless communications medium. If a receiver successfully decodes a packet, the receiver transmits an acknowledgement (ACK) to the sender confirming receipt. If the receiver unsuccessfully decodes the packet, the receiver transmits a negative acknowledgement (NACK). Upon receiving a NACK, the sender may retransmit the packet to improve the chances of successful decoding at the receiver. Multiple HARQ processes may run in parallel for different data packets. For example, sixteen processes may run in parallel.

The media access control (MAC) layer of the protocol stack manages HARQ processing. Currently, MAC entities start and stop various timers during the HARQ process. For example, a round trip time (RTT) timer starts when a physical downlink control channel (PDCCH) indicates a downlink transmission. The RTT timer controls a minimum duration before a downlink assignment for HARQ retransmission is expected by the MAC entity after a user equipment (UE) sends the HARQ feedback. Accordingly, the RTT timer may allow the UE to employ power savings techniques during this time.

In NR-U (new radio operating in an unlicensed or shared spectrum), the UE may receive a PDCCH without any downlink data transmission, e.g., a physical; downlink shared channel (PDSCH), but which includes a one shot HARQ-ACK request. The one shot HARQ-ACK request triggers one shot (also referred to as Type-3) HARQ feedback. One shot HARQ feedback includes the HARQ-ACK information for all HARQ processes at one time.

Aspects of the present disclosure address options for UE behavior, such as which HARQ processes should start or restart the RTT timer when the UE receives a one shot HARQ feedback request.

In some aspects of the present disclosure, the UE starts or restarts the RTT timer in the first symbol after the end of the corresponding transmission carrying the downlink HARQ feedback. In some aspects of the present disclosure, the RTT timer starts or restarts for a HARQ process if the RTT timer is already running. In other aspects, the RTT timer starts or restarts for a HARQ process if a retransmission timer is already running. If the RTT timer starts or restarts due to the running retransmission timer, the UE stops the retransmission timer.

According to aspects of the present disclosure, the UE starts or restarts the RTT timer for a HARQ process a pre-configured duration (e.g., gap) after the retransmission timer expires. According to further aspects of the present disclosure, the UE starts or restarts the RTT timer for a HARQ process when an activity timer is not running. The activity timer defines a period of time for when a HARQ process is active.

In still further aspects of the present disclosure, the UE starts or restarts the RTT timer for a HARQ process if a HARQ buffer for this process is not empty. According to further aspects of the present disclosure, the UE starts or restarts the RTT timer for the HARQ process including the downlink control information (DCI) for the one shot HARQ feedback request.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an RTT timer setting module 140. For brevity, only one UE 120*d* is shown as including the RTT timer setting module 140. The RTT timer setting module 140 may receive, from a base station, a request for one shot hybrid automatic repeat request (HARQ) feedback for multiple HARQ processes. The RTT timer setting module 140 may also transmit, to the base station, the one shot HARQ feedback in response to receiving the request. The RTT timer setting module 140 may also start or restart a discontinuous reception (DRX) HARQ round trip time (RTT) timer for one of the HARQ processes based at least on satisfying a condition, after transmitting the one shot HARQ feedback.

The base stations 110 may include an RTT timer setting module 138. For brevity, only one base station 110*a* is shown as including the RTT timer setting module 138. The RTT timer setting module 138 may transmit, to a user equipment (UE), a request for one shot hybrid automatic repeat request (HARQ) feedback for multiple HARQ processes. The RTT timer setting module 138 may also receive, from the UE, the one shot HARQ feedback in response to receiving the request. The RTT timer setting module 138 may refrain from scheduling data for a period of time for the UE for one of the HARQ processes based at least on satisfying a condition, after receiving the one shot HARQ feedback.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
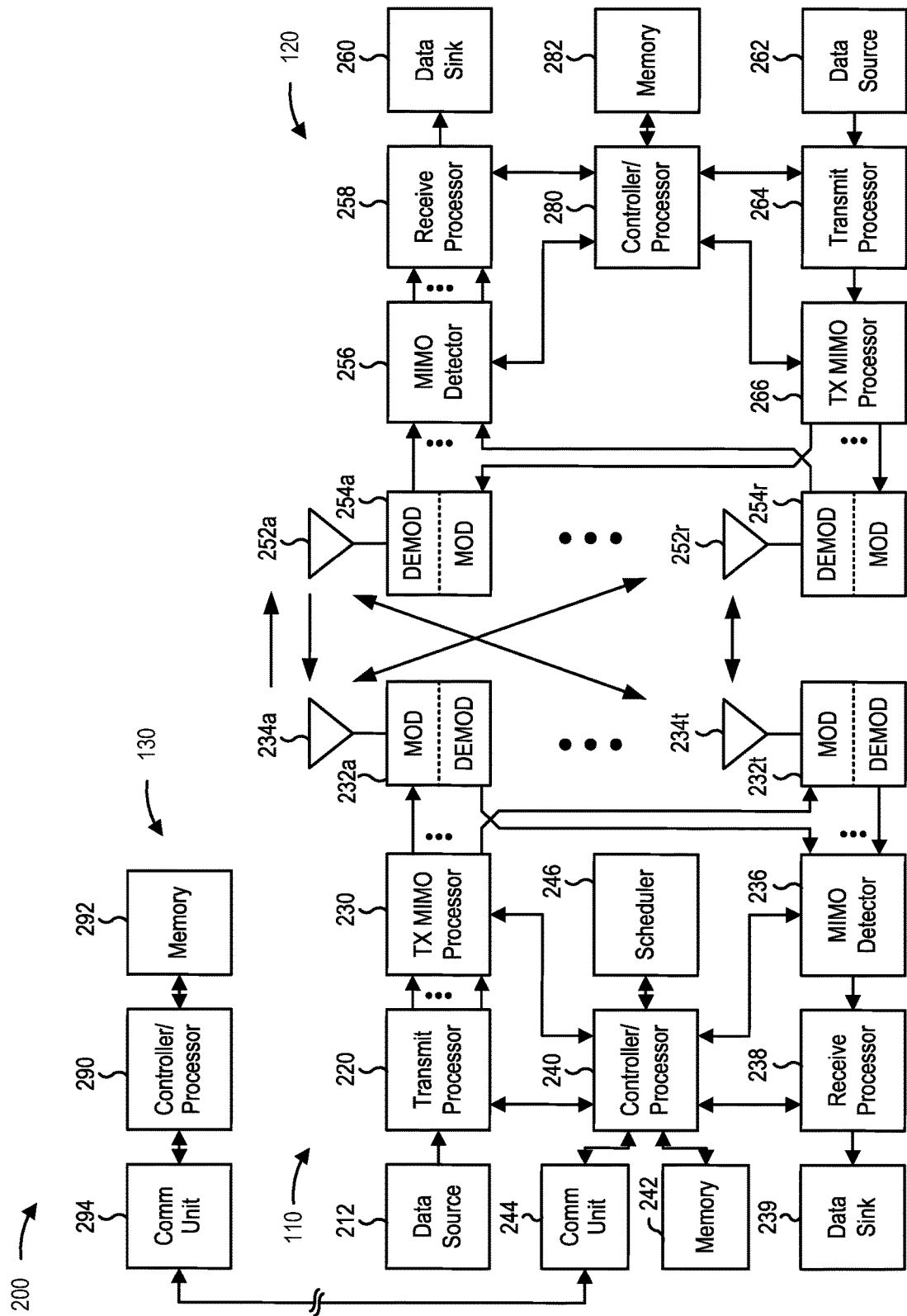
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with RTT timer setting as described in more detail elsewhere. For example, the controller/processor 240 of the base station 110, the controller/processor 280 of the UE 120, and/or any other component(s) of FIG. 2 may perform or direct operations of, for example, the processes of FIGS. 7 and 8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for transmitting, means for starting, means for restarting, and means for refraining. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
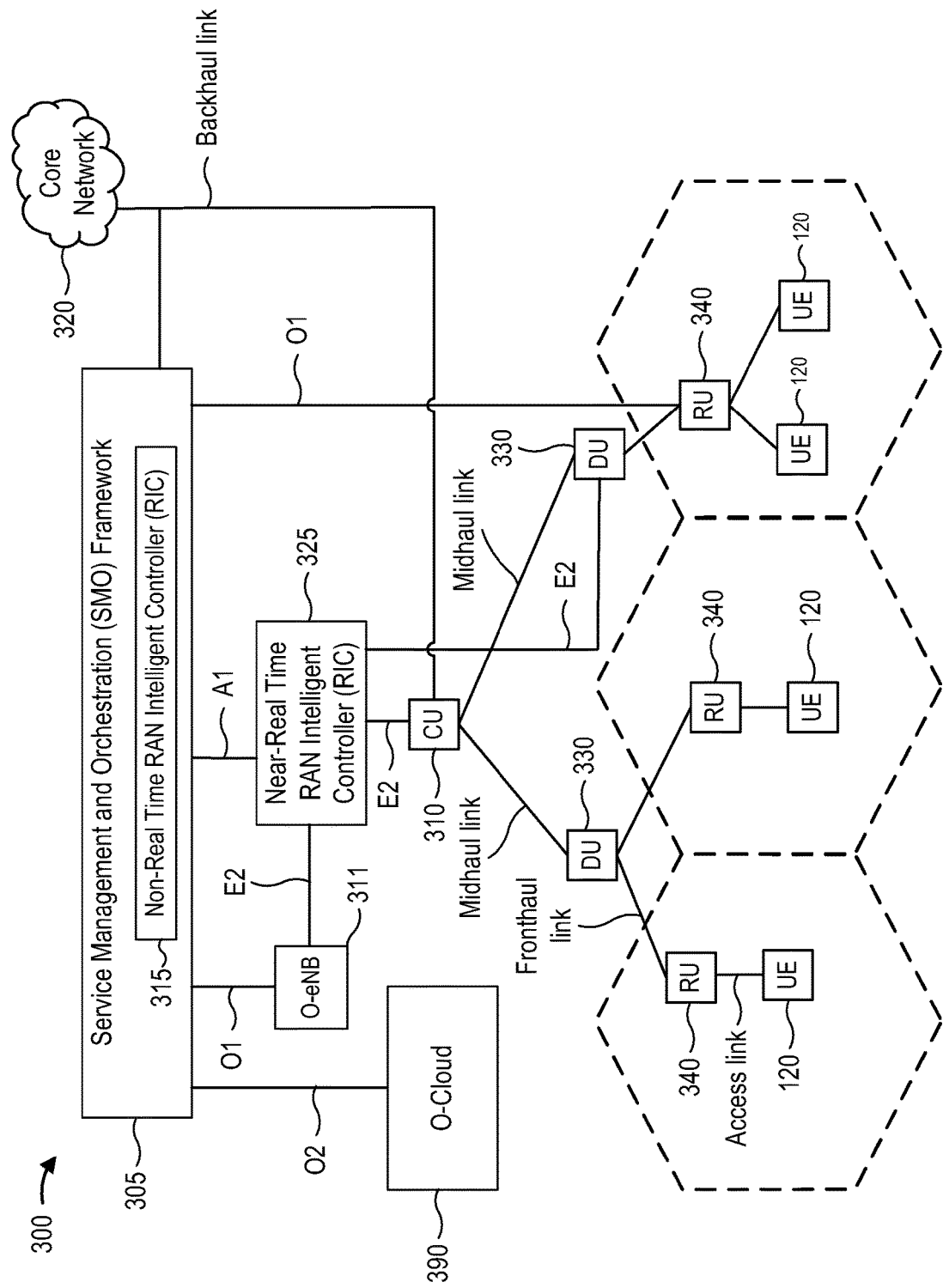
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Hybrid automatic repeat request (HARQ) processing improves communications reliability by acknowledging and negatively acknowledging packets transmitted across a wireless communications medium. If a receiver successfully decodes a packet, the receiver transmits an acknowledgement (ACK) to the sender confirming receipt. If the receiver unsuccessfully decodes the packet, the receiver transmits a negative acknowledgement (NACK). Upon receiving a NACK, the sender may retransmit the packet to improve the chances of successful decoding at the receiver. Multiple HARQ processes may run in parallel for different data packets. For example, sixteen processes may run in parallel.

The media access control (MAC) layer of the protocol stack manages HARQ processing. Currently, MAC entities start and stop various timers during the HARQ process. For example, a round trip time (RTT) timer (e.g., drx-HARQ-RTT-TimerDL) may start when a physical downlink control channel (PDCCH) indicates a downlink transmission. The round trip time (RTT) timer (e.g., drx-HARQ-RTT-TimerDL) controls a minimum duration before a downlink assignment for HARQ retransmission is expected by the MAC entity after the UE sends the HARQ feedback. The RTT timer is based on a per downlink HARQ process. The RTT timer allows a UE to employ power savings techniques during this time. For example, the UE may sleep while the timer runs.

Figure 4:
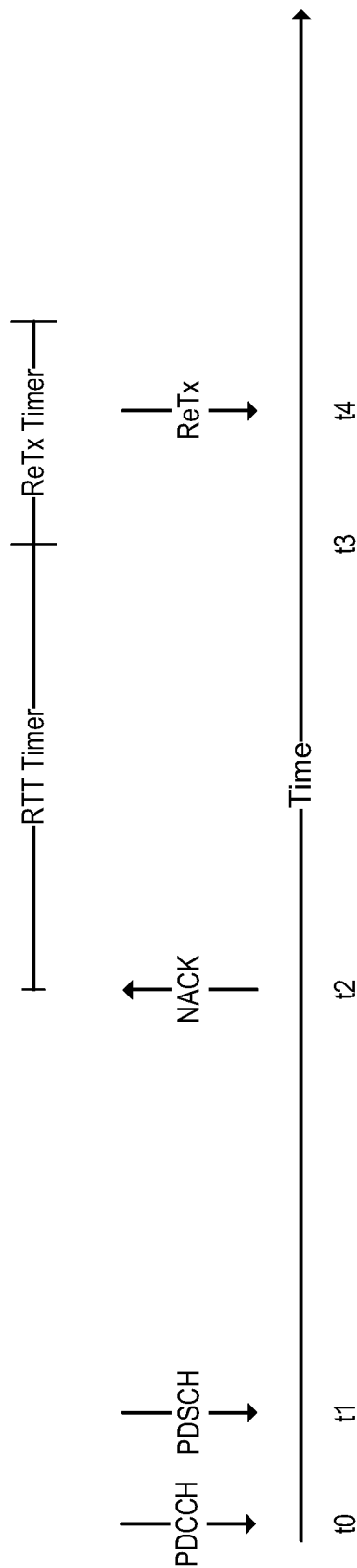
FIG. 4 is a timing diagram illustrating a hybrid automatic repeat request (HARQ) process.

FIG. 4 is a timing diagram illustrating a hybrid automatic repeat request (HARQ) process. At time t0, the UE receives a control channel (e.g., a PDCCH) indicating a physical downlink shared channel (PDSCH). For example, the UE may receive a DCI message that schedules a downlink assignment on the PDSCH. At time t1, the UE receives the PDSCH. After failing to decode the PDSCH, the UE transmits a NACK (e.g., via physical uplink control channel (PUCCH) or physical uplink shared channel (PUSCH)) at time t2. The UE starts the RTT timer after transmitting the NACK. While the RTT timer runs, the UE may enter a sleep mode during this particular HARQ process. After the RTT timer expires, at time t3, the UE awakens from the sleep mode to receive a retransmission (ReTx) and a retransmission timer starts. The retransmission timer is based on a per downlink HARQ process. The retransmission timer may specify a maximum duration until a downlink retransmission is received. That is, the retransmission timer specifies a number of slots the UE remains active to wait for incoming retransmissions after a first available retransmission time. At time t4, the UE receives the retransmission.

Operation in unlicensed and shared spectrum includes alternative solutions for HARQ processing. In NR-U (New Radio operating in a shared spectrum), the UE may receive a PDCCH without any downlink data transmission, but which includes a one shot HARQ-ACK request. The one shot HARQ-ACK request triggers one shot (also referred to as Type-3) HARQ feedback. For Type-3 HARQ feedback, if a UE is provided with the parameter PDSCH-HARQ-ACK-OneShotFeedback and the UE detects a DCI format in any PDCCH monitoring occasion that includes a one shot HARQ-ACK request field with value 1, the UE may include the HARQ-ACK information in a Type-3 HARQ-ACK codebook for all HARQ processes.

As described above, the UE sends the HARQ results (e.g., ACK or NACK) for all of the HARQ processes when one shot HARQ feedback is used. It is noted that the UE will set the feedback for a HARQ process without a data transmission to NACK.

It would be desirable to define whether the RTT timer (e.g., drx-HARQ-RTT-TimerDL) should be started when the UE receives the one shot HARQ feedback request. As noted, the one shot feedback is for all processes and could thus prevent the UE from receiving any signals due to the UE sleeping for all processes. Aspects of the present disclosure address options for UE behavior, such as which HARQ processes should start or restart the RTT timer.

In some aspects of the present disclosure, the UE starts or restarts the RTT timer (e.g., drx-HARQ-RTT-TimerDL) in the first symbol after the end of the corresponding transmission carrying the downlink HARQ feedback. In other aspects, for one shot HARQ feedback, valid HARQ feedback is counted as the corresponding transmission carrying the downlink HARQ feedback. That is, a NACK transmitted in response to a transmission without data does not trigger the RTT timer.

In some aspects of the present disclosure, the RTT timer starts or restarts for a HARQ process if the RTT timer (e.g., drx-HARQ-RTT-TimerDL) is already running. For example, the RTT timer may be running for a previous HARQ feedback transmission that is not one shot HARQ feedback. In other aspects, the RTT timer is not started for any other HARQ processes.

In still other aspects, the RTT timer starts or restarts for a HARQ process if a retransmission timer (e.g., drx-RetransmissionTimerDL) is already running. In other aspects, the RTT timer is not started for any other HARQ processes. If the RTT timer starts or restarts due to the running retransmission timer, the UE stops the retransmission timer (e.g., drx-RetransmissionTimerDL) because both timers should not run at the same time. In further aspects, the UE starts or restarts the RTT timer for a HARQ process if either the RTT timer (e.g., drx-HARQ-RTT-TimerDL) or the retransmission timer (e.g., drx-RetransmissionTimerDL) is currently running. In other aspects, the RTT timer is not started for any other HARQ processes. Again, in this case, the UE stops the retransmission timer (e.g., drx-RetransmissionTimerDL), if the retransmission timer is running.

According to aspects of the present disclosure, the UE starts or restarts the RTT timer for a HARQ process a pre-configured duration (e.g., gap) after the retransmission timer (e.g., drx-RetransmissionTimerDL) expires. The base station may configure the gap length during RRC signaling. In some aspects, the gap is 10 ms. The UE may determine whether the retransmission timer expires within this time duration in order to start or restart the RTT timer. The UE may restart the RTT timer after the gap, e.g., 10 ms after the retransmission timer expires.

Figure 5:
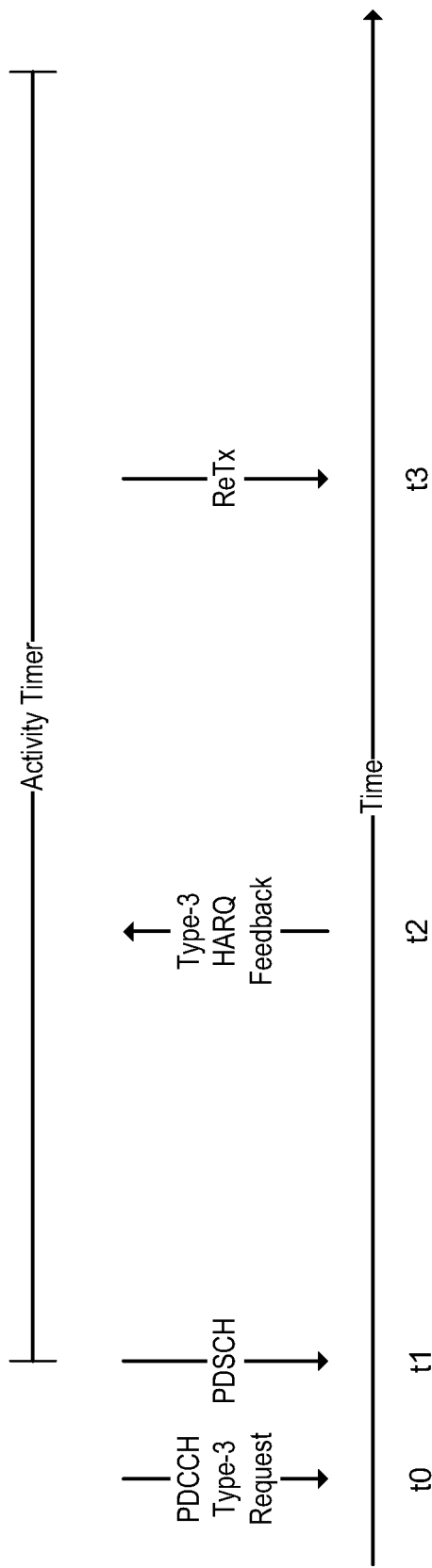
FIG. 5 is a timing diagram illustrating a one shot HARQ process with an activity timer, in accordance with aspects of the present disclosure.

According to further aspects of the present disclosure, the UE starts or restarts the RTT timer for a HARQ process when an activity timer is not running. In some aspects, the activity timer starts for a HARQ process when data is received for that process. FIG. 5 is a timing diagram illustrating a one shot HARQ process with an activity timer, in accordance with aspects of the present disclosure. At t0, the UE receives a PDCCH Type-3 request. For example, the UE receives a DCI message that includes a one shot HARQ-ACK request. At time t1, the UE receives a PDSCH and starts the activity timer. The activity timer defines a period of time for when a HARQ process is active. Whenever data is received on a HARQ process, the timer is started, for example for 50 ms. When the activity timer expires, the HARQ process is considered to be no longer in use. Although not shown in FIG. 5, the activity timer may start when the UE transmits the HARQ feedback (e.g., at time t2) instead of upon receiving the incoming PDSCH (e.g., at time t1). At time t3, the UE receives the retransmission.

Figure 6:
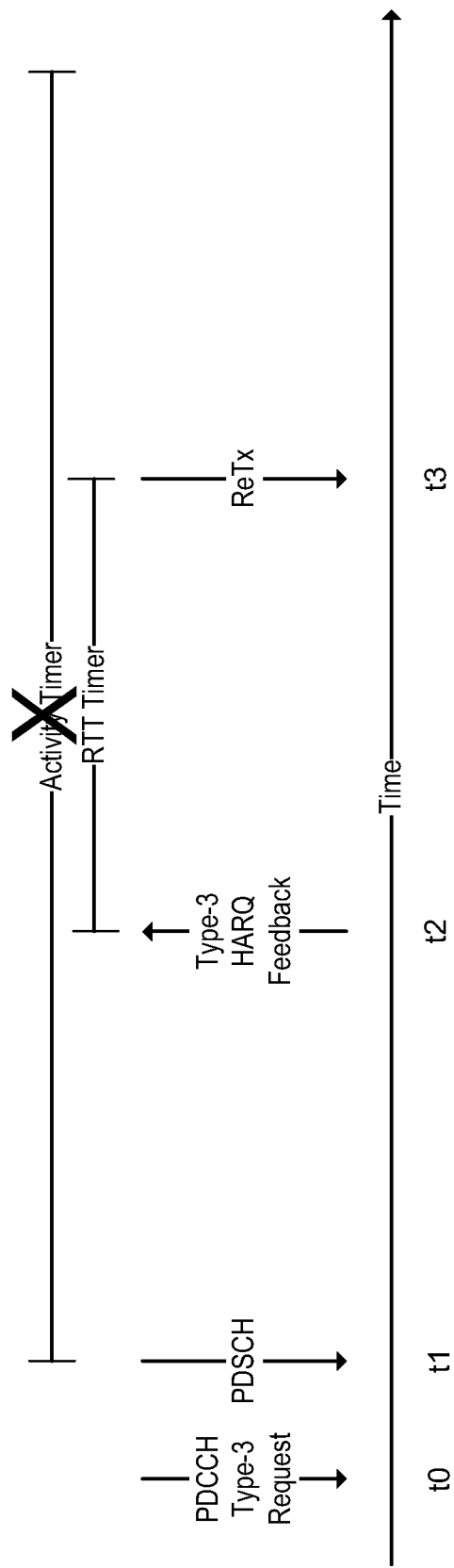
FIG. 6 is a timing diagram illustrating a one shot HARQ process with a round trip time (RTT) timer starting when an activity timer is not running, in accordance with aspects of the present disclosure.

FIG. 6 is a timing diagram illustrating a one shot HARQ process with a round trip time (RTT) timer starting when an activity timer is not running, in accordance with aspects of the present disclosure. At t0, the UE receives a PDCCH Type-3 request. For example, the UE receives a DCI message that includes a one shot HARQ-ACK request. At time t1, the UE receives a PDSCH. In this example, the UE does not start the activity timer. At time t2, the UE transmits HARQ feedback and determines an activity timer is not running. Thus, at time t2, the UE starts the RTT timer. At time t3, the UE receives the retransmission.

In still further aspects of the present disclosure, the UE starts or restarts the RTT timer for a HARQ process if a HARQ buffer for this process is not empty. This option may vary based on UE implementation. For example, different UEs may have different reasons for flushing the buffer or different UEs may have different buffer sizes. In some UE implementations, a UE flushes the HARQ buffer once the packet is successfully received and delivered to upper layers. It is also possible that the base station may not schedule any new retransmissions. In that case, a UE implementation may flush the buffer after waiting a certain time, even though the packet is not successfully received. That certain time will be up to the implementation. In other aspects, the RTT timer is not started for any other HARQ processes.

According to still further aspects of the present disclosure, the UE starts or restarts the RTT timer for the HARQ process including the DCI for the one shot HARQ feedback request. That is, the one shot HARQ feedback request arrives via DCI and has a corresponding HARQ process. The DCI also includes a field for a HARQ process number. In these aspects of the present disclosure, the UE starts the RTT timer for this particular HARQ process. In some aspects, the RTT timer is not started for any other HARQ processes. In further aspects, the UE starts or restarts the RTT timer for a certain HARQ process specified in the DCI. That is, the base station may request one shot feedback for certain HARQ processes. In these aspects, the timer starts (or restarts) for these requested HARQ processes.

As indicated above, FIGS. 4-6 are provided as examples. Other examples may differ from what is described with respect to FIGS. 4-6.

Figure 7:
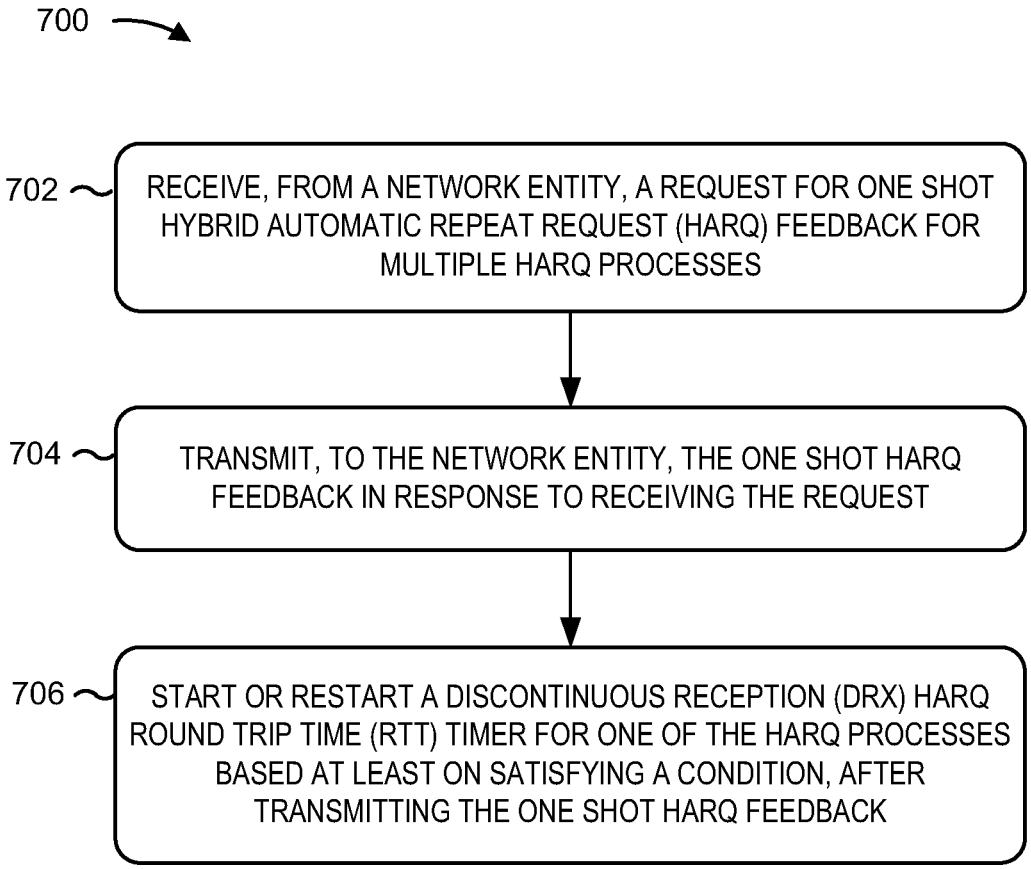
FIG. 7 is a flow diagram illustrating an example process performed, for example, by a user equipment (UE), in accordance with various aspects of the present disclosure.

FIG. 7 is a flow diagram illustrating an example process 700 performed, for example, by a user equipment (UE), in accordance with various aspects of the present disclosure. The example process 700 is an example of managing hybrid automatic repeat request (HARQ) timers for one shot HARQ feedback. The operations of the process 700 may be implemented by a UE 120.

At block 702, the user equipment (UE) receives, from a network entity station, a request for one shot hybrid automatic repeat request (HARQ) feedback for multiple HARQ processes. For example, the UE (e.g. using the antenna 252, DEMOD/MOD 254, MIMO detector 256, receive processor 258, controller/processor 280, and/or memory 282) may receive the request. The one shot HARQ feedback may be Type-3 HARQ feedback. At block 704, the user equipment (UE) transmits, to the network entity, the one shot HARQ feedback in response to receiving the request. For example, the UE (e.g. using the antenna 252, DEMOD/MOD 254, TX MIMO processor 256, transmit processor 264, controller/processor 280, and/or memory 282) may transmit the feedback. The UE may start or restart an activity timer in response to receiving data or in response to transmitting any HARQ feedback for the one of the plurality of HARQ processes, the activity timer defining a period of time for when the one of the plurality of HARQ processes is active.

At block 706, the user equipment (UE) starts or restarts a discontinuous reception (DRX) HARQ round trip time (RTT) timer for one of the HARQ processes based at least on satisfying a condition, after transmitting the one shot HARQ feedback. For example, the UE (e.g. using the controller/processor 280, and/or memory 282) may start or restart the round trip timer (RTT). In some aspects, the starting or restarting occurs in a first symbol after transmission of the one shot HARQ feedback has completed. In some aspects, the condition is satisfied when the one shot HARQ feedback is associated with receiving a transmission with data. In other aspects, the condition is satisfied when the DRX HARQ RTT timer is currently running for the one of the HARQ processes. In still other aspects, the condition is satisfied when a DRX retransmission timer is currently running for the one of the processes. In yet other aspects, the condition is satisfied a pre-configured duration after a DRX retransmission time expires for the one of the processes. In still other aspects, the condition is satisfied when an activity timer is currently not running for the one of the processes. In some aspects, the condition is satisfied when a buffer for the one of the HARQ processes contains data. In other aspects, the condition is satisfied when the one of the HARQ processes includes downlink control information (DCI) for the request for one shot HARQ feedback.

Figure 8:
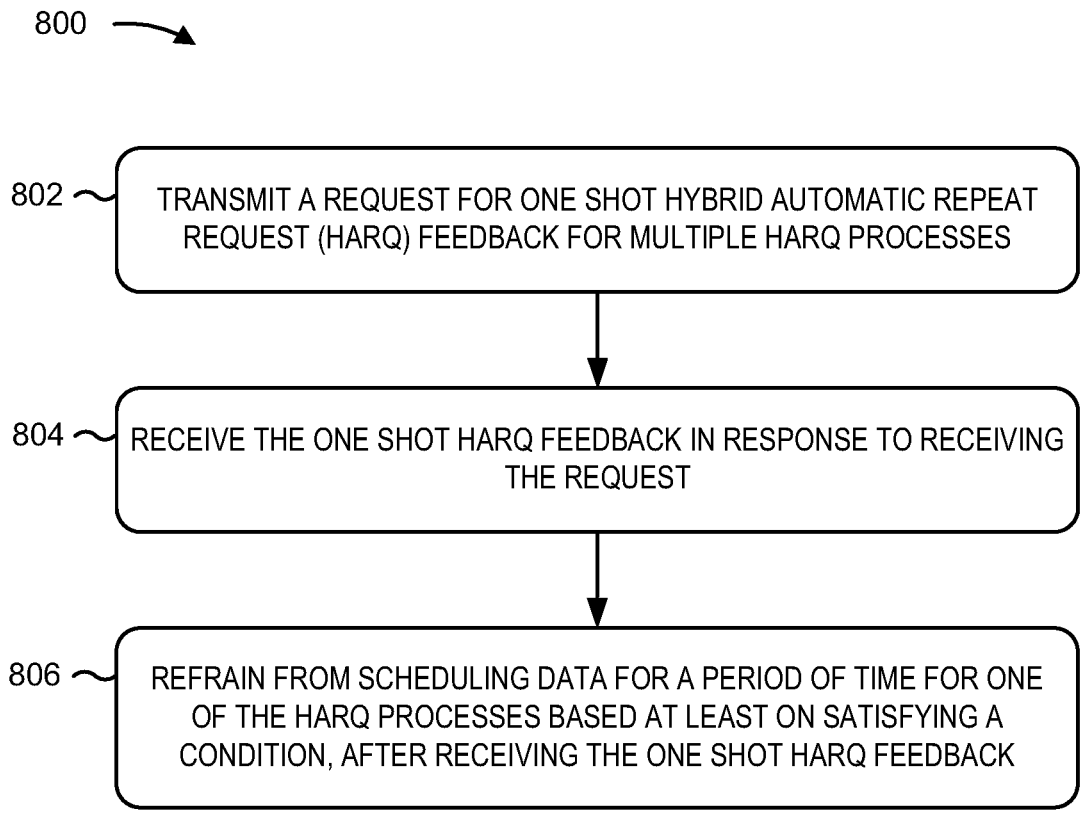
FIG. 8 is a flow diagram illustrating an example process performed, for example, by a network entity, in accordance with various aspects of the present disclosure.

FIG. 8 is a flow diagram illustrating an example process 800 performed, for example, by a network entity, in accordance with various aspects of the present disclosure. The example process 800 is an example of managing hybrid automatic repeat request (HARQ) timers for one shot HARQ feedback. The operations of the process 800 may be implemented by a base station 110 or a distributed unit (DU) 330 of a disaggregated base station 300.

At block 802, the network entity transmits a request for one shot hybrid automatic repeat request (HARQ) feedback for multiple HARQ processes. For example, the base station (e.g. using the antenna 234, MOD/DEMOD 232, TX MIMO processor 230, transmit processor 220, controller/processor 240, and/or memory 242) may transmit the request. The one shot HARQ feedback may be Type-3 HARQ feedback. At block 804, the network entity receives the one shot HARQ feedback in response to receiving the request. For example, the base station (e.g. using the antenna 234, MOD/DEMOD 232, MIMO detector 236, receive processor 238, controller/processor 240, and/or memory 242) may receive the feedback.

At block 806, the network entity refrains from scheduling data for a period of time for one of the HARQ processes based at least on satisfying a condition, after receiving the one shot HARQ feedback. For example, the base station (e.g. using the controller/processor 240, and/or memory 242) may refrain from scheduling data. In some aspects, the condition is satisfied when the one shot HARQ feedback is associated with receiving a transmission with data. In other aspects, the condition is satisfied when the DRX HARQ RTT timer is currently running for the one of the HARQ processes. In still other aspects, the condition is satisfied when a DRX retransmission timer is currently running for the one of the processes. In yet other aspects, the condition is satisfied a pre-configured duration after a DRX retransmission time expires for the one of the processes. In still other aspects, the condition is satisfied when an activity timer is currently not running for the one of the processes. In some aspects, the condition is satisfied when a buffer for the one of the HARQ processes contains data. In other aspects, the condition is satisfied when the one of the HARQ processes includes downlink control information (DCI) for the request for one shot HARQ feedback.

EXAMPLE ASPECTS

Aspect 1: A method of wireless communication by a user equipment (UE), comprising: receiving, from a network entity, a request for one shot hybrid automatic repeat request (HARQ) feedback for a plurality of HARQ processes; transmitting, to the network entity, the one shot HARQ feedback in response to receiving the request; and after transmitting the one shot HARQ feedback, starting or restarting a discontinuous reception (DRX) HARQ round trip time (RTT) timer for one of the plurality of HARQ processes based at least on satisfying a condition.

Aspect 2: The method of Aspect 1, in which the starting or restarting occurs in a first symbol after transmission of the one shot HARQ feedback has completed.

Aspect 3: The method of Aspect 1 or 2, in which the condition is satisfied when the one shot HARQ feedback is associated with receiving a downlink data transmission.

Aspect 4: The method of any of the preceding Aspects, in which the condition is satisfied when the DRX HARQ RTT timer is currently running for the one of the plurality of HARQ processes.

Aspect 5: The method of any of the preceding Aspects, in which the condition is satisfied when a DRX retransmission timer is currently running for the one of the plurality of processes, the method further comprising stopping the DRX retransmission timer for the one of the plurality of processes.

Aspect 6: The method of any of the preceding Aspects, in which the condition is satisfied within a pre-configured duration after a DRX retransmission time expires for the one of the plurality of processes.

Aspect 7: The method of any of the preceding Aspects, in which the condition is satisfied when an activity timer is currently not running for the one of the plurality of processes, the activity timer defining when the one of the plurality of HARQ processes is active.

Aspect 8: The method of any of the preceding aspects, further comprising starting or restarting an activity timer in response to receiving data or in response to transmitting any HARQ feedback for the one of the plurality of HARQ processes, the activity timer defining a period of time for when the one of the plurality of HARQ processes is active.

Aspect 9: The method of any of the preceding Aspects, in which the condition is satisfied when a buffer for the one of the plurality of HARQ processes contains data.

Aspect 10: The method of any of the preceding Aspects, in which the condition is satisfied when the one of the plurality of HARQ processes includes downlink control information (DCI) for the request for one shot HARQ feedback.

Aspect 11: The method of any of the preceding Aspects, in which the condition is satisfied when downlink control information (DCI) specifies the one of the plurality of HARQ processes for one shot HARQ feedback.

Aspect 12: The method of any of the preceding Aspects, in which the one shot HARQ feedback includes Type-3 HARQ feedback.

Aspect 13: A method of wireless communication by a network entity, comprising: transmitting, a request for one shot hybrid automatic repeat request (HARQ) feedback for a plurality of HARQ processes; receiving the one shot HARQ feedback in response to receiving the request; and after receiving the one shot HARQ feedback, refraining from scheduling data for a user equipment (UE) for a period of time for one of the plurality of HARQ processes based at least on satisfying a condition.

Aspect 14: The method of Aspect-13, in which the condition is satisfied when a discontinuous reception (DRX) HARQ round trip time (RTT) timer is currently running for the one of the plurality of HARQ processes.

Aspect 15: The method of any of the Aspects 13-14, in which the condition is satisfied when a discontinuous reception (DRX) retransmission timer is currently running for the one of the plurality of processes.

Aspect 16: The method of any of the Aspects 13-15, in which the condition is satisfied within a pre-configured duration after a discontinuous reception (DRX) retransmission time expires for the one of the plurality of processes.

Aspect 17: The method of any of the Aspects 13-16, in which the condition is satisfied when an activity timer is currently not running for the one of the plurality of processes, the activity timer defining when the one of the plurality of HARQ processes is active.

Aspect 18: The method of any of the Aspects 13-17, in which the condition is satisfied when a user equipment (UE) buffer for the one of the plurality of HARQ processes contains data.

Aspect 19: The method of any of the Aspects 13-18, in which the condition is satisfied when the one of the plurality of HARQ processes includes downlink control information (DCI) for the request for one shot HARQ feedback.

Aspect 20: The method of any of the Aspects 13-19, in which the one shot HARQ feedback includes Type-3 HARQ feedback.

Aspect 21: An apparatus for wireless communication by a user equipment (UE), comprising: a memory; and at least one processor coupled to the memory, the at least one processor configured: to receive, from a network entity, a request for one shot hybrid automatic repeat request (HARQ) feedback for a plurality of HARQ processes; to transmit, to the network entity, the one shot HARQ feedback in response to receiving the request; and after transmitting the one shot HARQ feedback, to start or restart a discontinuous reception (DRX) HARQ round trip time (RTT) timer for one of the plurality of HARQ processes based at least on satisfying a condition.

Aspect 22: The apparatus of Aspect 21, in which the at least one processor is configured to start or restart in a first symbol after transmission of the one shot HARQ feedback has completed.

Aspect 23: The apparatus of Aspect 21 or 22, in which the condition is satisfied when the one shot HARQ feedback is associated with receiving a downlink data transmission.

Aspect 24: The apparatus of any of the Aspects 21-23, in which the condition is satisfied when the DRX HARQ RTT timer is currently running for the one of the plurality of HARQ processes.

Aspect 25: The apparatus of any of the Aspects 21-24, in which the condition is satisfied when a DRX retransmission timer is currently running for the one of the plurality of processes, the method further comprising stopping the DRX retransmission timer for the one of the plurality of processes.

Aspect 26: The apparatus of any of the Aspects 21-25, in which the condition is satisfied within a pre-configured duration after a DRX retransmission time expires for the one of the plurality of processes.

Aspect 27: The apparatus of any of the Aspects 21-26, in which the condition is satisfied when an activity timer is currently not running for the one of the plurality of processes, the activity timer defining when the one of the plurality of HARQ processes is active.

Aspect 28: The apparatus of any of the Aspects 21-27, in which the condition is satisfied when a buffer for the one of the plurality of HARQ processes contains data.

Aspect 29: The apparatus of any of the Aspects 21-28, in which the condition is satisfied when the one of the plurality of HARQ processes includes downlink control information (DCI) for the request for one shot HARQ feedback.

Aspect 30: The apparatus of any of the Aspects 21-29, in which the one shot HARQ feedback includes Type-3 HARQ feedback.

Aspect 31: An apparatus for wireless communication by a network entity station, comprising: a memory; and at least one processor coupled to the memory, the at least one processor configured: to transmit a request for one shot hybrid automatic repeat request (HARQ) feedback for a plurality of HARQ processes; to receive the one shot HARQ feedback in response to receiving the request; and after receiving the one shot HARQ feedback, refraining from scheduling data for a user equipment (UE) for a period of time for one of the plurality of HARQ processes based at least on satisfying a condition.

Aspect 32: The apparatus of Aspect 31, in which the condition is satisfied when a discontinuous reception (DRX) HARQ round trip time (RTT) timer is currently running for the one of the plurality of HARQ processes.

Aspect 33: The apparatus of Aspect 31 or 32, in which the condition is satisfied when a discontinuous reception (DRX) retransmission timer is currently running for the one of the plurality of processes.

Aspect 34: The apparatus of any of the Aspects 31-33, in which the condition is satisfied within a pre-configured duration after a discontinuous reception (DRX) retransmission time expires for the one of the plurality of processes.

Aspect 35: The apparatus of any of the Aspects 31-34, in which the condition is satisfied when an activity timer is currently not running for the one of the plurality of processes, the activity timer defining when the one of the plurality of HARQ processes is active.

Aspect 36: The apparatus of any of the Aspects 31-35, in which the condition is satisfied when a user equipment (UE) buffer for the one of the plurality of HARQ processes contains data.

Aspect 37: The apparatus of any of the Aspects 31-36, in which the condition is satisfied when the one of the plurality of HARQ processes includes downlink control information (DCI) for the request for one shot HARQ feedback.

Aspect 38: The apparatus of any of the Aspects 31-37, in which the one shot HARQ feedback includes Type-3 HARQ feedback.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving, from a network entity, a request for one shot hybrid automatic repeat request (HARQ) feedback for a plurality of HARQ processes, the one shot HARQ feedback comprising Type-3 HARQ feedback;
   transmitting, to the network entity, the one shot HARQ feedback in response to receiving the request; and
   after transmitting the one shot HARQ feedback, starting or restarting a discontinuous reception (DRX) HARQ round trip time (RTT) timer for one of the plurality of HARQ processes based at least on satisfying a condition for when the DRX HARQ RTT timer starts or restarts.

2. The method of claim 1, in which the starting or restarting occurs in a first symbol after transmission of the one shot HARQ feedback has completed.

3. The method of claim 1, in which the condition is satisfied when the one shot HARQ feedback is associated with receiving a downlink data transmission.

4. The method of claim 1, in which the condition is satisfied when the DRX HARQ RTT timer is currently running for the one of the plurality of HARQ processes.

5. The method of claim 1, in which the condition is satisfied when a DRX retransmission timer is currently running for the one of the plurality of processes, the method further comprising stopping the DRX retransmission timer for the one of the plurality of processes.

6. The method of claim 1, in which the condition is satisfied within a pre-configured duration after a DRX retransmission time expires for the one of the plurality of processes.

7. The method of claim 1, in which the condition is satisfied when an activity timer is currently not running for the one of the plurality of processes, the activity timer defining when the one of the plurality of HARQ processes is active.

8. The method of claim 1, further comprising starting or restarting an activity timer in response to receiving data or in response to transmitting any HARQ feedback for the one of the plurality of HARQ processes, the activity timer defining a period of time for when the one of the plurality of HARQ processes is active.

9. The method of claim 1, in which the condition is satisfied when a buffer for the one of the plurality of HARQ processes contains data.

10. The method of claim 1, in which the condition is satisfied when the one of the plurality of HARQ processes includes downlink control information (DCI) for the request for one shot HARQ feedback.

11. The method of claim 1, in which the condition is satisfied when downlink control information (DCI) specifies the one of the plurality of HARQ processes for one shot HARQ feedback.

12. A method of wireless communication by a network entity, comprising:
   transmitting a request for one shot hybrid automatic repeat request (HARQ) feedback for a plurality of HARQ processes, the one shot HARQ feedback comprising Type-3 HARQ feedback;
   receiving the one shot HARQ feedback in response to receiving the request; and
   after receiving the one shot HARQ feedback, refraining from scheduling data for a period of time for a user equipment (UE) for one of the plurality of HARQ processes based at least on satisfying a condition for when the DRX HARQ RTT timer starts or restarts.

13. The method of claim 12, in which the condition is satisfied when a discontinuous reception (DRX) HARQ round trip time (RTT) timer is currently running for the one of the plurality of HARQ processes.

14. The method of claim 12, in which the condition is satisfied when a discontinuous reception (DRX) retransmission timer is currently running for the one of the plurality of processes.

15. The method of claim 12, in which the condition is satisfied within a pre-configured duration after a discontinuous reception (DRX) retransmission time expires for the one of the plurality of processes.

16. The method of claim 12, in which the condition is satisfied when an activity timer is currently not running for the one of the plurality of processes, the activity timer defining when the one of the plurality of HARQ processes is active.

17. The method of claim 12, in which the condition is satisfied when a user equipment (UE) buffer for the one of the plurality of HARQ processes contains data.

18. The method of claim 12, in which the condition is satisfied when the one of the plurality of HARQ processes includes downlink control information (DCI) for the request for one shot HARQ feedback.

19. An apparatus for wireless communication by a user equipment (UE), comprising:
    memory; and
    at least one processor coupled to the memory, the at least one processor configured:
        to receive, from a network entity, a request for one shot hybrid automatic repeat request (HARQ) feedback for a plurality of HARQ processes, the one shot HARQ feedback comprising Type-3 HARQ feedback;
        to transmit, to the network entity, the one shot HARQ feedback in response to receiving the request; and
        after transmitting the one shot HARQ feedback, to start or restart a discontinuous reception (DRX) HARQ round trip time (RTT) timer for one of the plurality of HARQ processes based at least on satisfying a condition for when the DRX HARQ RTT timer starts or restarts.

20. The apparatus of claim 19, in which the at least one processor is configured to start or restart in a first symbol after transmission of the one shot HARQ feedback has completed.

21. The apparatus of claim 19, in which the condition is satisfied when the one shot HARQ feedback is associated with receiving a downlink data transmission.

22. The apparatus of claim 19, in which the condition is satisfied when the DRX HARQ RTT timer is currently running for the one of the plurality of HARQ processes.

23. The apparatus of claim 19, in which the condition is satisfied when a DRX retransmission timer is currently running for the one of the plurality of processes, the at least one processor further configured to stop the DRX retransmission timer for the one of the plurality of processes.

24. The apparatus of claim 19, in which the condition is satisfied within a pre-configured duration after a DRX retransmission time expires for the one of the plurality of processes.

25. The apparatus of claim 19, in which the condition is satisfied when an activity timer is currently not running for the one of the plurality of processes, the activity timer defining when the one of the plurality of HARQ processes is active.

26. The apparatus of claim 19, in which the condition is satisfied when a buffer for the one of the plurality of HARQ processes contains data.

27. The apparatus of claim 19, in which the condition is satisfied when the one of the plurality of HARQ processes includes downlink control information (DCI) for the request for one shot HARQ feedback.

* * * * *